(12) United States Patent
Hibiya (10) Patent No.: US 10,976,553 B2
(45) Date of Patent: Apr. 13, 2021

(54) OPTICAL SCANNING APPARATUS AND RETINAL SCANNING HEAD-MOUNTED DISPLAY

(71) Applicant: Riichiro Hibiya, Tokyo (JP)

(72) Inventor: Riichiro Hibiya, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 148 days.

(21) Appl. No.: 16/334,520

(22) PCT Filed: Aug. 23, 2017

(86) PCT No.: PCT/JP2017/030066
§ 371 (c)(1),
(2) Date: Mar. 19, 2019

(87) PCT Pub. No.: WO2018/061539
PCT Pub. Date: Apr. 5, 2018

(65) Prior Publication Data
US 2020/0363640 A1    Nov. 19, 2020

(30) Foreign Application Priority Data

Sep. 30, 2016  (JP) .............................. JP2016-194861

(51) Int. Cl.
*G02B 27/01*    (2006.01)
*G02B 26/10*    (2006.01)
(Continued)

(52) U.S. Cl.
CPC ......... *G02B 27/0172* (2013.01); *G02B 26/10* (2013.01); *G02B 27/02* (2013.01); *G09G 3/02* (2013.01); *G02B 2027/0178* (2013.01)

(58) Field of Classification Search
CPC .... G02B 27/0172; G02B 26/10; G02B 27/02; G02B 2027/0178; G09G 3/02
See application file for complete search history.

(56) References Cited

U.S. PATENT DOCUMENTS 7,628,327 B2 * 12/2009 Winkler ............... G03B 21/005
235/454
7,746,527 B2 *  6/2010 Takeda ............... G02B 26/0841
359/202.1
(Continued)

FOREIGN PATENT DOCUMENTS

JP    2005-032798    2/2005
JP    2007-097337    4/2007
(Continued)

OTHER PUBLICATIONS

Japanese Office Action for 2018-541992 dated Jan. 14, 2020.
(Continued)

*Primary Examiner* — Grant Sitta
(74) *Attorney, Agent, or Firm* — IPUSA, PLLC (57) ABSTRACT

It is an object of the present invention to provide an optical scanning apparatus and a retinal scanning head-mounted display that prevent an overcurrent from being supplied to a light source.

An optical scanning apparatus of the present invention includes a light source (125) configured to emit light; a light source driving unit (124) configured to supply a driving current to the light source; an optical scanning unit (30) configured to scan the light emitted from the light source in accordance with an image signal such that the light is projected onto a projection surface; a light amount sensor configured to detect an amount of the light; a current sensor (140) configured to detect the driving current; a primary stop control unit (122) configured to stop an operation of the light source driving unit when the amount of the light is equal to or exceeds a predetermined amount of light; and a secondary stop control unit (150) configured to stop supply of the
(Continued)

driving current to the light source when a value of the driving current is equal to or exceeds a predetermined threshold.

3 Claims, 10 Drawing Sheets

(51) Int. Cl.
*G02B 27/02* (2006.01)
*G09G 3/02* (2006.01)

(56) References Cited

U.S. PATENT DOCUMENTS

| | | | | |
|---|---|---|---|---|
| 7,756,174 B2* | 7/2010 | Benner, Jr. | ............ | H04N 9/3129 |
| | | | | 372/38.09 |
| 7,911,412 B2* | 3/2011 | Benner, Jr. | ............ | H04N 9/3129 |
| | | | | 345/55 |
| 8,717,342 B2* | 5/2014 | Rothaar | ............. | G02B 27/0172 |
| | | | | 345/207 |
| 8,926,102 B2* | 1/2015 | Tsai | ...................... | H04N 9/3129 |
| | | | | 353/121 |
| 9,140,971 B2* | 9/2015 | Woltman | ............ | H04N 9/3155 |
| 9,482,933 B2* | 11/2016 | Chuang | .................. | G03B 33/06 |
| 9,736,439 B2* | 8/2017 | Xue | ....................... | G06F 1/3203 |
| 9,800,844 B2* | 10/2017 | Nakahara | ............. | H04N 1/113 |
| 9,823,353 B2* | 11/2017 | Eichenholz | ........... | G01S 7/4817 |
| 10,033,975 B2* | 7/2018 | Lim | ...................... | G02B 26/123 |
| 2005/0024704 A1* | 2/2005 | Sakai | ................ | G02B 26/0808 |
| | | | | 359/212.1 |
| 2006/0291510 A1* | 12/2006 | Juluri | .................... | H01S 5/0683 |
| | | | | 372/29.021 |
| 2007/0285625 A1* | 12/2007 | Yavid | .................... | H04N 9/3173 |
| | | | | 353/85 |
| 2008/0180633 A1 | 7/2008 | Yamada et al. | | |
| 2010/0177929 A1* | 7/2010 | Kurtz | ................... | H04N 9/3161 |
| | | | | 382/103 |
| 2011/0102763 A1* | 5/2011 | Brown | .................... | G01S 7/481 |
| | | | | 356/4.01 |
| 2012/0154957 A1* | 6/2012 | Williams | ................. | H02H 1/06 |
| | | | | 361/1 |
| 2012/0218525 A1* | 8/2012 | Kwon | .................. | H04N 9/3135 |
| | | | | 353/85 |
| 2012/0320103 A1* | 12/2012 | Jesme | .................. | H04N 9/3155 |
| | | | | 345/690 |
| 2013/0003026 A1* | 1/2013 | Rothaar | ............. | G03B 21/2033 |
| | | | | 353/85 |
| 2014/0064756 A1* | 3/2014 | Sugiyama | ............. | G03G 13/00 |
| | | | | 399/44 |
| 2015/0022898 A1 | 1/2015 | Yamakawa et al. | | |
| 2015/0238362 A1 | 8/2015 | Chayet et al. | | |
| 2016/0081171 A1* | 3/2016 | Ichikawa | ............... | H05B 47/20 |
| | | | | 315/77 |
| 2017/0299721 A1* | 10/2017 | Eichenholz | ........... | G01S 7/4815 |

FOREIGN PATENT DOCUMENTS

| | | |
|---|---|---|
| JP | 2012-049317 | 3/2012 |
| JP | 2012-078532 | 4/2012 |
| JP | 2013-156314 | 8/2013 |
| JP | 2013-164482 | 8/2013 |
| JP | 2014-093396 | 5/2014 |
| JP | 2015-526187 | 9/2015 |
| WO | 2013/001590 | 1/2013 |

OTHER PUBLICATIONS

International Search Report for PCT/JP2017/030066 dated Nov. 14, 2017.
Japanese Office Action for 2018-541992 dated Jun. 23, 2020 (JP Application No. 2018-541992).

* cited by examiner

OPTICAL SCANNING APPARATUS AND RETINAL SCANNING HEAD-MOUNTED DISPLAY

TECHNICAL FIELD

The present invention relates to an optical scanning apparatus and a retinal scanning head-mounted display.

BACKGROUND ART

Conventionally, optical scanning apparatuses have been devised to prevent the supply of current equal to or in excess of specified amounts to lasers. More specifically, a technology that prevents an overcurrent from being supplied to a laser by providing a current fuse in a path for supplying a current to the laser, is known.

RELATED-ART DOCUMENTS

Patent Document [1] Japanese Patent No. 4792899

SUMMARY OF THE INVENTION

Problem to be Solved by the Invention

Due to the frequency characteristics, the conventional current fuse cannot be used, for example, in a retinal scanning head-mounted display in which high-speed current switching is performed.

However, there has been a demand, particularly in a retina scanning projection apparatus, for controlling the amount of light emitted from a light source for safety purposes, in such a manner that the amount of light is maintained at or below a predetermined value, and thus an overcurrent is prevented from being supplied to the light source.

The technology disclosed herein is made in view of the above-described points, and an object is to provide an optical scanning apparatus and a retinal scanning head-mounted display in which the supply of an overcurrent to the light source may be avoided.

Means to Solve the Problem

According to the technology disclosed herein, an optical scanning apparatus may include a light source (125) configured to emit light; a light source driving unit (124) configured to supply a driving current to the light source; an optical scanning unit (30) configured to scan the light emitted from the light source in accordance with an image signal such that the light is projected onto a projection surface; a light amount sensor (125a) configured to detect an amount of the light; a current sensor (140) configured to detect the driving current; a primary stop control unit (122) configured to stop an operation of the light source driving unit (124) when the amount of the light is equal to or exceeds a predetermined amount of light; and a secondary stop control unit (150) configured to stop supply of the driving current to the light source when a value of the driving current is equal to or exceeds a predetermined threshold.

It should be noted that the reference numerals in parentheses are given merely as examples to facilitate understanding, and the present invention is not limited by the examples illustrated in the figures.

Effects of the Invention

According to the technology disclosed herein, it is possible to prevent an overcurrent from being supplied to a light source.

MODE FOR CARRYING OUT THE INVENTION

First Embodiment

A retinal scanning projection apparatus according to a first embodiment includes a primary stop control unit that stops suppling a current to a light source in accordance with the amount of light emitted from the light source, and also includes a secondary stop control unit that stops supply of a current to the light source in accordance with the amount of the current supplied to the light source. Accordingly, an overcurrent is prevented from being supplied to the light source.

Figure 1:
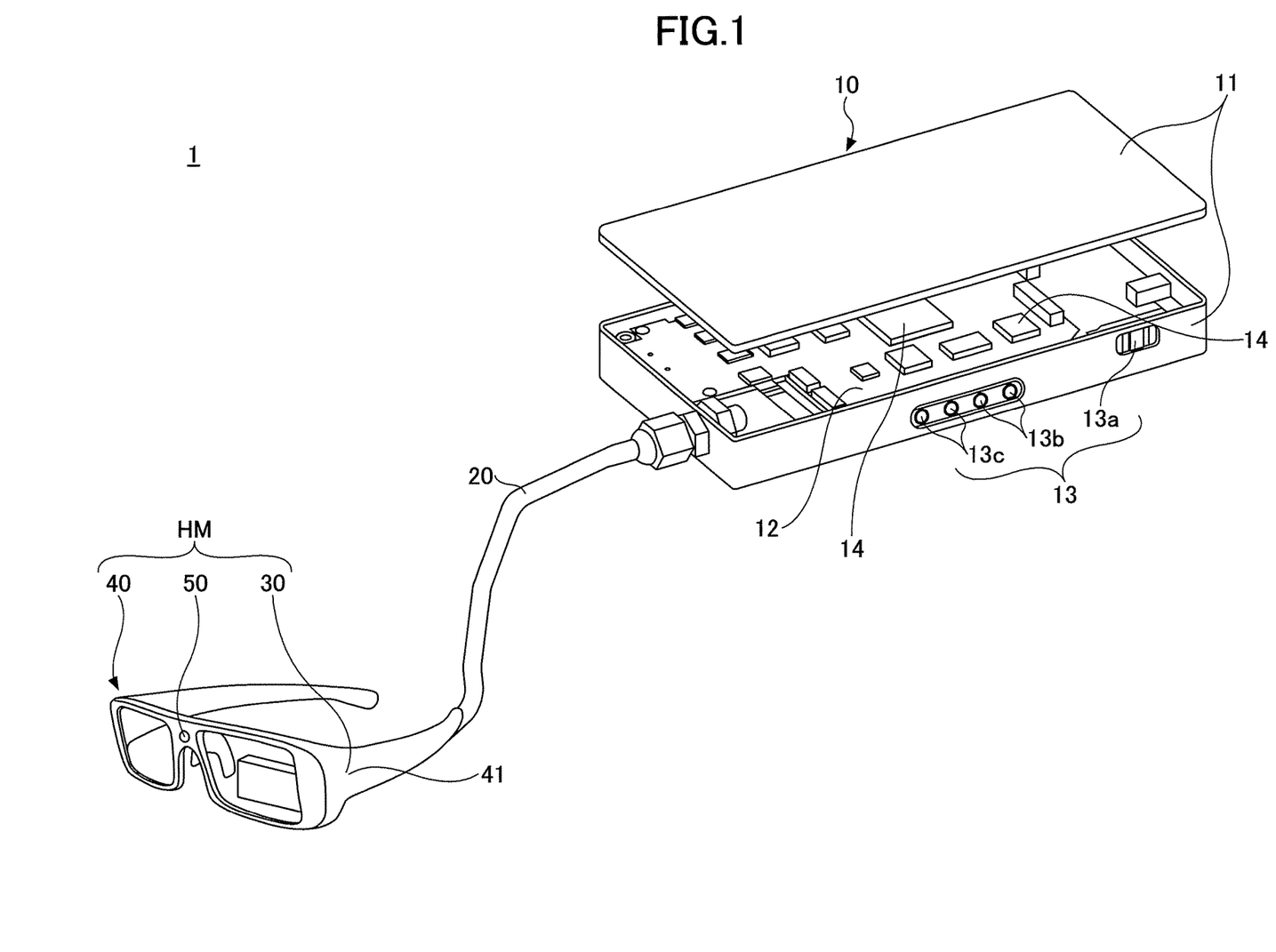
FIG. 1 is a first diagram illustrating a retinal scanning projection apparatus according to a first embodiment.

In the following, the retinal scanning projection apparatus according to the first embodiment will be described with reference to the drawings. FIG. 1 is a first diagram illustrating the retinal scanning projection apparatus according to the first embodiment.

A retinal scanning projection apparatus 1 according to the first embodiment is a retinal scanning head-mounted display that utilizes Maxwell View. Maxwell View is a method of causing a user to visually recognize an image represented by image data without being affected by a function of a crystalline lens of the user, by projecting image light based on the image data (hereinafter may be referred to as an image light beam) on a retina after the image light has converged once at the center of a pupil.

The overall configuration of the retinal scanning projection apparatus 1 is described. As illustrated in FIG. 1, the retinal scanning projection apparatus 1 includes an optical scanning control device 10, a transmission cable 20; and a head mount unit HM.

The optical scanning control device 10 has a portable size such that the optical scanning control device 10 is accommodated, for example, in the pocket of a user's clothes. The optical scanning control device 10 emits, as image light, a laser beam having intensity in accordance with an image signal. Details of the optical scanning control device 10 will be described later.

The transmission cable 20 transmits image light emitted from the optical scanning control device 10 to an optical scanning unit 30.

The head mount unit HM includes the optical scanning unit 30, an eyeglass frame 40, and an image capturing unit 50.

The optical scanning unit 30 scans image light transmitted from the transmission cable 20 such that the image light is projected onto an eyeball (retina) of the user. In this manner, an image represented by the image light can be projected onto the retina of the user.

The eyeglass frame 40 is configured to be attachable to the head of the user. The image capturing unit 50 has a camera, for example. The optical scanning unit 30 and the image capturing unit 50 are included in the eyeglass frame 40.

As used herein, image light refers to light generated based on information that can be a source of an image to be projected onto the user's retina by the optical scanning unit 30. The information that can be the source of the image may be a symbol, such as a character and a number, or may be an image.

The optical scanning control device 10 includes a housing 11 that can be operated by the user, an electronic circuit board 12, and an operation unit 13. The operation unit 13 is provided on a side surface of the housing 11. The operation unit 13 includes, for example, a power supply switch 13a, phase switches 13b, adjusters 13c for adjusting the size of an image. The electronic circuit board 12 is housed in the housing 11. A plurality of IC chips 14 for implementing an operation of the optical scanning control device 10 is mounted on the electronic circuit board 12.

Figure 2:
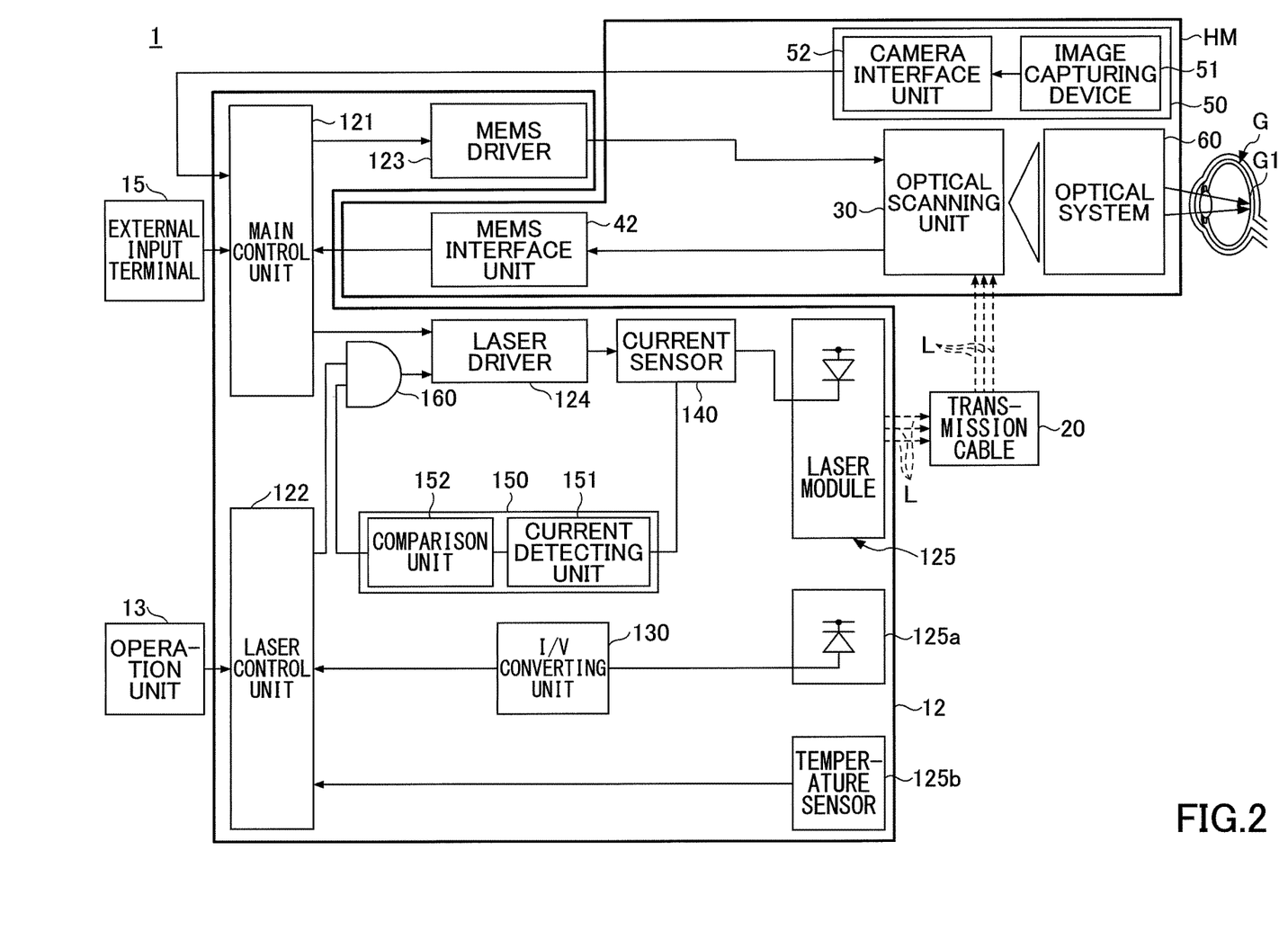
FIG. 2 is a second diagram illustrating the retinal scanning projection apparatus according to the first embodiment.

The optical scanning control device 10 is provided with an external input terminal 15 (see FIG. 2). The optical scanning control device 10 receives, for example, content information transmitted from an external device such as a personal computer (not illustrated) through the external input terminal 15. It should be noted that the content information is information to be projected onto the retina of the user, such as a character, an image, and video. More specifically, the content information is, for example, a text file, an image file, and a video file used on a personal computer.

The optical scanning control device 10 according to the present embodiment is configured such that image signals can be input from two systems. One of the two systems is the image capturing unit 50 and the other is an external device. Image signals can be input from the image capturing unit 50 and from the external device through the external input terminal 15.

The operation unit 13 according to the embodiment includes a selection switch (not illustrated) for allowing the user to select whether to project light onto the user's retina in accordance with an image signal from the image capturing unit 50 or to project light onto the user's retina in accordance with an image signal from the external device.

FIG. 2 is a second diagram illustrating the retinal scanning projection apparatus according to the first embodiment. In FIG. 2, a configuration of the head mount unit HM, and circuit blocks of the electronic circuit board 12 are illustrated.

First, the head mount unit HM will be described.

The head mount unit HM according to the present embodiment includes the optical scanning unit 30, a micro-electro-mechanical system (MEMS) interface 42, the image capturing unit 50, and an optical system 60.

The optical scanning unit 30 is, for example, a micro-electro-mechanical system (MEMS) mirror. The optical scanning unit 30 is, for example, provided at a temple 41 of the eyeglass frame 40. The optical scanning unit 30 scans a laser beam emitted from a laser module 125, which will be described later, in a horizontal direction and in a vertical direction based on a drive control signal. The drive control signal is output from an MEMS driver 123, which will be described below.

Further, as a method for projecting an image onto a retina G1 of an eyeball G by using the image light, a method (raster scanning, for example) for displaying an image by scanning, at high speed, light from the upper left to the lower left of a region onto which to project the image may be employed.

Image light emitted from the optical scanning unit 30 is converged by the optical system and projected onto the retina G1. It should be noted that the optical system 60 is provided at the temple 41 of the eyeglass frame 40.

An MEMS interface unit 42 detects the motion (a deflection angle) of the optical scanning unit 30 (the MEMS mirror), and outputs motion information corresponding to the tilt of the optical scanning unit 30 to a main control unit 121, which will be described later. It should be noted that the MEMS interface unit 42 according to the embodiment may include a temperature sensor (not illustrated), and the MEMS interface unit 42 may detect a temperature of the optical scanning unit 30 so as to output temperature information to the main control unit 121.

The image capturing unit 50 according to the present embodiment includes an image capturing device 51 and a camera interface unit 52.

The image capturing device 51 is a camera with, for example, a complementary metal-oxide-semiconductor (CMOS) image sensor. The camera interface unit 52 outputs an image signal output from the image capturing device 51 to the main control unit 121, which will be described later.

Next, the circuit blocks of the electronic circuit board 12 of the optical scanning control device 10 will be described.

The electronic circuit board 12 includes the main control unit 121, a laser control unit 122, the MEMS driver 123, a laser driver 124, and the laser module (light source) 125. Further, the electronic circuit board 12 according to the embodiment includes a current/voltage (I/V) converting unit 130, a current sensor 140, an overcurrent detecting unit 150, and an AND circuit 160.

In the present embodiment, the I/V converting unit 130 and the laser control unit 122 form a primary stop control unit configured to stop supplying a current to the light source in accordance with the amount of light emitted from the light source. Further, in the present embodiment, the overcurrent detecting unit 150 forms a secondary stop control unit configured to stop supplying a current to the light source in accordance with the amount of the current supplied to the light source. It should be noted that the current sensor 140 and the overcurrent detecting unit 150 are provided for each of a plurality of color laser diodes (light emitting elements) included in the laser module 125. Further, the I/V converting unit 130 is provided for each of light amount sensors 125a that correspond to the respective laser diodes, which will be described later.

The main control unit 121 is implemented by a processor such as a central processing unit (CPU), a random-access memory (RAM), and a read-only memory (ROM), for example. Image signals from the two systems, which are an image signal output from the image capturing unit 50 and content information (an image signal) output from the external device through the external input terminal 15, are input to the main control unit 121. The main control unit 121 performs processing of the image signals that have been input, and performs drive control of the optical scanning unit 30 (MEMS mirror).

Further, based on motion information, temperature information, and other information of the optical scanning unit 30 (MEMS mirror) obtained from the MEMS interface unit 42, the main control unit 121 controls driving of the optical scanning unit 30 (MEMS mirror) and emission of image light from the laser module 125.

Further, the main control unit 121 outputs, to the MEMS driver 123, a drive control signal for controlling driving of the optical scanning unit 30. The MEMS driver 123 outputs the received drive control signal to the optical scanning unit 30.

Further, the main control unit 121 outputs, to the laser driver 124, the image signals that have been input. The laser driver 124 generates an emission control signal for turning-on and turning-off of the light source based on the image signals, and outputs the generated emission control signal to the laser module 125.

The laser control unit 122 is implemented by a processor, such as a CPU, a RAM, and a ROM, for example. In response to an operation for turning on the power supply, a zoom-in operation, or a zoom-out operation being performed on the operation unit 13, the laser control unit 122 outputs, to the laser module 125, a control signal in accordance with the operation. It should be noted that, when an operation for selecting either of the image signals from the two systems is received from the selection switch of the operation unit 13, the laser control unit 122 according to the present embodiment outputs a control signal to the laser module 125 in accordance with the operation.

In response to instructions from the main control unit 121, the laser module 125 outputs (emits), for example, light beams L with one or more wavelengths to the optical scanning unit 30. The light beams L are image light beams for projecting an image onto the retina G1 of the user's eyeball G. The light beams L emitted from the laser module 125 are transmitted to the optical scanning unit 30 via the transmission cable 20.

For example, the laser module 125 may include respective laser diodes that emit a red laser beam (a wavelength of approximately 610 nm to 660 nm), a green laser beam (a wavelength of approximately 515 nm to 540 nm), and a blue laser beam (a wavelength of approximately 440 nm to 480 nm). The respective laser beams in colors of red, green, and blue are emitted. The laser module 125 according to the present embodiment is implemented, for example, by a light source in which laser diode chips in RGB (red, green, and blue), a device for combining the three colors, and a micro-collimator lens are integrated.

Additionally, the retinal scanning projection apparatus 1 according to the present embodiment includes the light amount sensors 125a and temperature sensors 125b. The light amount sensors 125a and the temperature sensors 125b are provided for the respective color laser diodes included in the laser module 125.

The light amount sensors 125a detect amounts of light of the respective laser diodes included in the laser module 125, and output the detected light amount information to the laser control unit 122. To be more specific, the light amount sensors 125a output currents corresponding to amounts of light of the respective laser diodes, and output voltages corresponding to the amounts of light of the respective laser diodes to the laser control unit 122 through the I/V converting unit 130. The temperature sensors 125b detect temperatures of the respective laser diodes included in the laser module 125, and output information on the detected temperatures to the laser control unit 122.

Based on the amounts of light detected by the light amount sensor 125a, the laser control unit 122 generates a signal for controlling the amounts of light of the respective laser diodes included in the laser module 125, and the laser control unit 122 outputs the generated signal to the laser module 125.

The I/V converting unit 130 according to the embodiment converts the currents output from the light amount sensors 125a into voltages, and supplies the voltages to the laser control unit 122.

When any of the voltages supplied from the I/V converting unit 130 is greater than or equal to a predetermined threshold voltage, the laser control unit 122 according to the present embodiment outputs a signal indicating that an overcurrent has been detected. In other words, when any of the amounts of light emitted from the laser module 125 is greater than or equal to a predetermined amount of light, the laser control unit 122 according to the present embodiment outputs a signal indicating that an overcurrent has been detected. The output of the laser control unit 122 is supplied to one input of the AND circuit 160. It should be noted that the predetermined amount of light is preliminarily set in accordance with properties of the laser diodes.

The current sensor 140 according to the present embodiment is a sensor used to detect the value of a current supplied from the laser driver 124 to the laser module 125. The current sensor 140 according to the present embodiment may be, for example, a resistor. Further, the current supplied to the laser module 125 is a driving current supplied to each of the laser diodes.

The overcurrent detecting unit 150 detects whether the driving current supplied to a corresponding laser diode is an overcurrent. The overcurrent detecting unit 150 according to the present embodiment includes a detecting unit 151 and a comparison unit 152. The current detecting unit 151 detects the driving current by using the current sensor 140. The comparison unit 152 compares the driving current detected by the current sensor 140 to a predetermined threshold current that is preliminarily set. In the present embodiment, when the driving current detected by the current sensor 140 is equal to or exceeds the predetermined threshold current, it is considered that an overcurrent is detected. In other words, when the driving current supplied to the corresponding laser diode is equal to or exceeds the predetermined threshold current, the comparison unit 152 outputs a signal for stopping the supply of currents to the light source. It should be noted that the predetermined threshold is preliminarily set in accordance with properties of the laser diodes.

A comparison result, obtained by the comparison unit 152 as an output of the overcurrent detecting unit 150, is supplied to the other input of the AND circuit 160. An output of the AND circuit 160 is supplied to the laser driver 124. When a high-level (hereinafter referred to as an "H level") signal is supplied from the AND circuit 160, the laser driver 124 stops its operation. Namely, when an H-level signal is input to at least one of the inputs of the AND circuit 160, the laser driver 124 stops the supply of driving currents to the laser module 125.

In the following, an operation for detecting an overcurrent will be described. First, an example in which an overcurrent is detected based on the amount of light emitted from the laser diodes will be described.

In this case, the laser control unit 122 determines whether a voltage output from the I/V converting unit 130 is greater than or equal to the predetermined threshold voltage. Namely, the laser control unit 122 determines whether an amount of light emitted from any of the laser diodes is greater than or equal the predetermined amount of light.

When it is determined that the voltage output from the I/V converting unit 130 is greater than or equal to the predetermined threshold, the laser control unit 122 switches from outputting a low level (hereinafter referred to as an L level) signal to an H-level signal to the AND circuit 160.

Because the H-level signal is input to one of the inputs of the AND circuit 160, the AND circuit 160 outputs an H-level signal. Accordingly, the laser driver 124 stops its operation, and the supply of driving currents to the laser module 125 is also stopped. As a result, outputs of the laser module 125 stop. In other words, the laser diodes are turned off.

Next, an example in which an overcurrent is detected based on the driving currents supplied to laser diodes will be described.

In this case, the overcurrent detecting unit 150 causes the current detecting unit 151 to obtain values of driving currents supplied to the laser diodes, which have been detected by the current sensor 140, and the overcurrent detecting unit 150 outputs the values of the driving currents to the comparison unit 152.

When any of the values of the driving currents is equal to or exceeds the predetermined threshold current, the comparison unit 152 switches a signal being output to the AND circuit 160 from an L-level signal to an H-level signal.

When the H-level signal is input to one of the inputs of the AND circuit 160, the AND circuit 160 outputs an H-level signal. Accordingly, the laser driver 124 stops its operation, and supply of driving currents to the laser module 125 is also stopped. As a result, outputs of the laser module 125 stop. In other words, the laser diodes are turned off.

As described above, according to the present embodiment, an overcurrent supplied to any of the laser diodes is detected based on both the amount of light emitted from the laser diodes and the amount of driving currents supplied to the laser diodes. In other words, according to the present embodiment, two independent methods are used to detect whether a driving current supplied to any of the laser diodes is an overcurrent, and based on a detection result, the supply of driving currents to the laser diodes are stopped.

According to the present embodiment, even if a failure occurs in the laser control unit 122 for any reason, an overcurrent can be detected by the overcurrent detecting unit 150, and the supply of driving currents to the laser diodes can be stopped. Furthermore, even if the driving currents supplied to the laser diodes fails to be detected for any reason, an overcurrent can be detected based on the amount of light emitted from the laser diodes, and the supply of the driving currents to the laser diode can be stopped.

Therefore, according to the present embodiment, it is possible to improve safety in controlling the amounts of image light emitted from the laser diodes. In particular, in the retinal scanning projection apparatus 1 in which laser beams are projected to the user's retina, the above-described embodiment is effective in terms of improving safety.

Although the present embodiment is applied to the retinal scanning projection apparatus, an apparatus to which the present embodiment is applied is not limited to the retinal scanning projection apparatus. The present embodiment may be applied to any projection apparatus such as a projector having a commonly used optical scanning unit.

Second Embodiment

Figure 3:
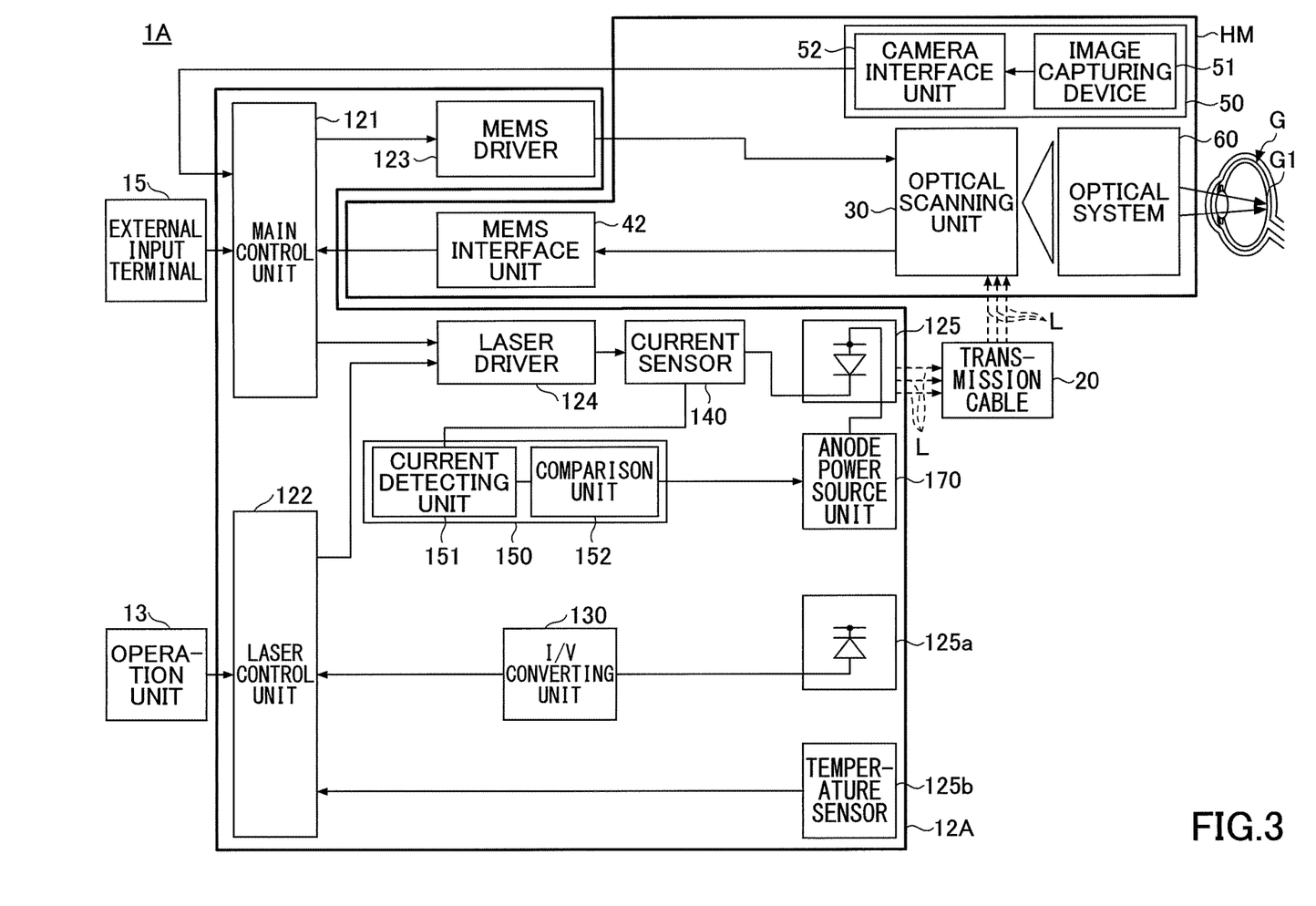
FIG. 3 is a diagram illustrating a retinal scanning projection apparatus according to a second embodiment.

A second embodiment will be described below with reference to the drawings. The second embodiment differs from the first embodiment in that an output of the overcurrent detecting unit is supplied to a power source unit of the laser module 125. In the following second embodiment, only differences from the first embodiment will be described. Elements having the same functional configurations as the first embodiment are referred to by the same reference numerals used in the first embodiment, and thus a description thereof will be omitted.

FIG. 3 is a diagram illustrating a retinal scanning projection apparatus according to the second embodiment. A retinal scanning projection apparatus 1A according to the second embodiment includes an electronic circuit board 12A. The electronic circuit board 12A includes an anode power source unit 170 that is connected to an anode side of each laser diode included in the laser module 125 and that supplies power to the laser diodes.

Further, the electronic circuit board 12A includes the overcurrent detecting unit 150. An output of the overcurrent detecting unit 150 is supplied to the anode power source unit 170 that supplies power to the laser module 125.

In the present embodiment, when the output of the overcurrent detecting unit 150 is switched from an L-level signal to an H-level signal, the power supplied from the anode power source unit 170 to the laser module 125 is stopped. Therefore, according to the present embodiment, when the overcurrent detecting unit 150 detects an overcurrent, supply of the driving currents to the laser diodes is stopped.

It should be noted that power supplied to the laser module 125 may be stopped when the output of the overcurrent detecting unit 150 is switched from an H-level signal to an L-level signal. In this case, the comparison unit 152 switches from an H-level signal to an L-level signal when the driving current supplied to any of the laser diodes is equal to or exceeds the threshold.

As described, in the present embodiment, as with the first embodiment, two independent methods are used to detect whether a driving current supplied to any of the laser diodes is an overcurrent, and based on a detection result, the supply of the driving currents to the laser diodes is stopped. Therefore, according to the present embodiment, safety in controlling the amounts of image light emitted from the laser diodes can be improved.

Third Embodiment

Figure 4:
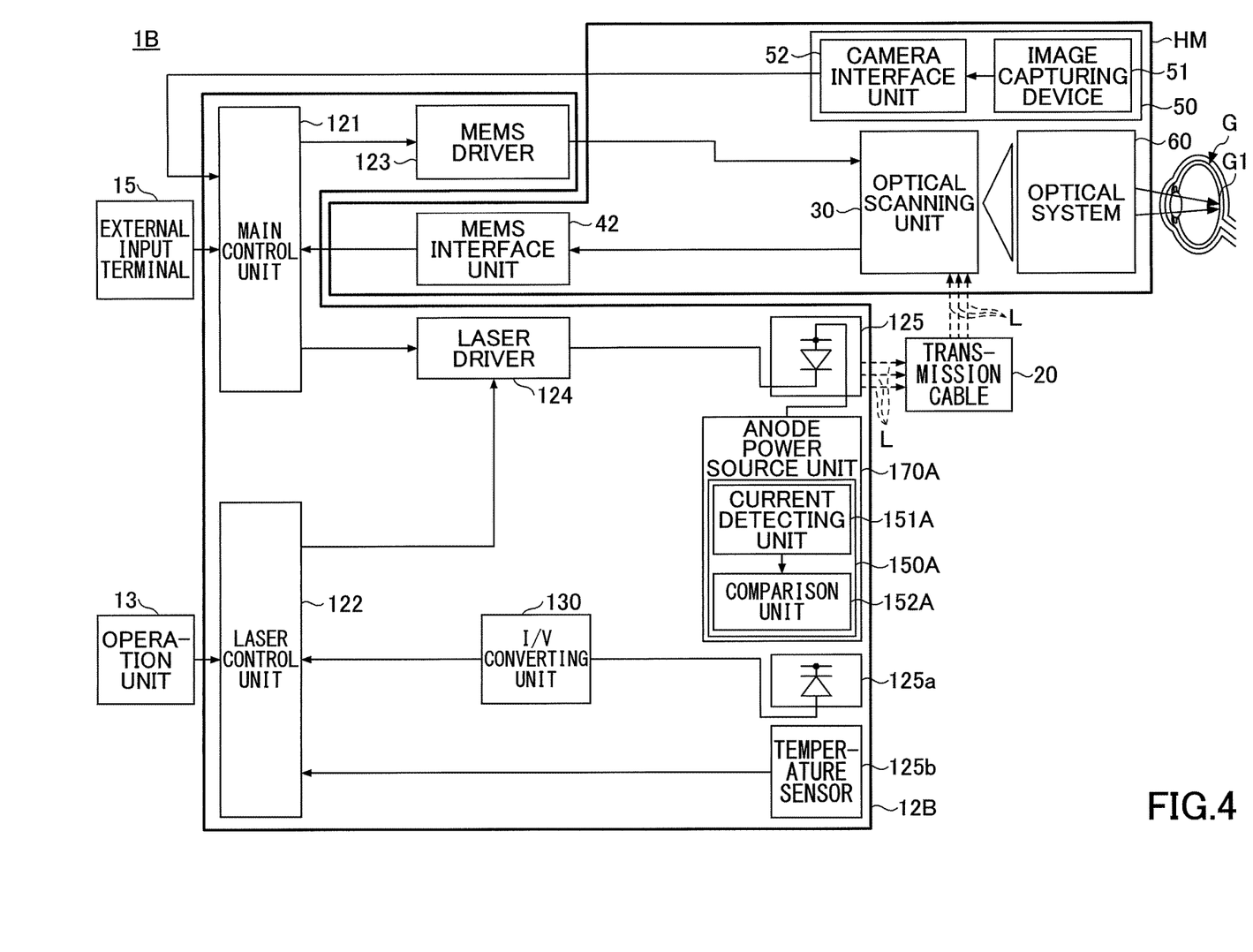
FIG. 4 is a first diagram illustrating a retinal scanning projection apparatus according to a third embodiment.

A third embodiment will be described below with reference to the drawings. The third embodiment differs from the second embodiment in that an overcurrent is detected in an anode power source unit 170. In the following third embodiment, only differences from the second embodiment will be described. Elements having the same functional configurations as the first embodiment are referred to by the same reference numerals used in the first embodiment, and thus a description thereof will be omitted.

FIG. 4 is a diagram illustrating a retinal scanning projection apparatus according to the third embodiment. The retinal scanning projection apparatus 1B according to the present embodiment includes an electronic circuit board 12B. The electronic circuit board 12B includes an anode power source unit 170A.

The anode power source unit 170A according to the present embodiment includes an overcurrent detecting unit 150A.

The overcurrent detecting unit 150A includes a current detecting unit 151A and a comparison unit 152A. In the anode power source unit 170A, the current detecting unit 151A detects values of driving currents supplied to a plurality of laser diodes.

The comparison unit 152A compares the values of the driving currents, detected by the current detecting unit 151A, to a threshold. When any of the detected driving currents reaches or exceeds the threshold, the comparison unit 152A stops the power supplied from the anode power source unit 170A to the laser module 125. According to the present embodiment, when the overcurrent detecting unit 150A detects an overcurrent, the supply of the driving currents to the laser diodes is stopped.

As described, in the present embodiment, as with the first embodiment, two independent methods are used to detect whether a driving current supplied to any of the laser diodes is an overcurrent, and based on a detection result, supply of the driving currents to the laser diodes is stopped. Therefore, according to the present embodiment, safety in controlling the amounts of image light emitted from the laser diodes can be improved.

Fourth Embodiment

A fourth embodiment will be described below with reference to the drawings. In the fourth embodiment, a primary stop control unit and a secondary stop control unit are configured by circuits. In the following fourth embodiment, only differences from the first embodiment will be described. Elements having the same functional configurations as the first embodiment are referred to by the same reference numerals used in the first embodiment, and thus a description thereof will be omitted.

Figure 5:
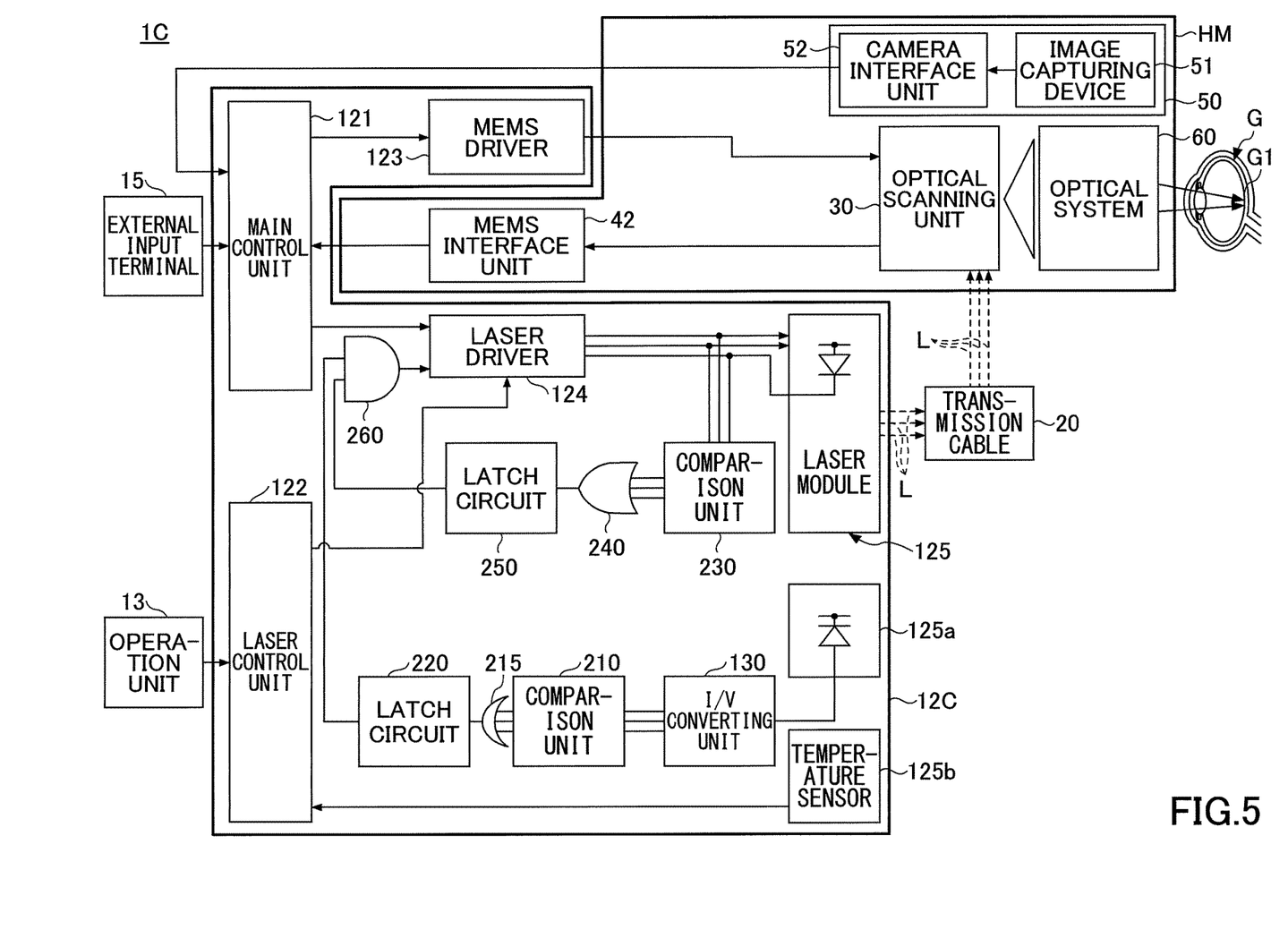
FIG. 5 is a diagram illustrating a retinal scanning projection apparatus according to a fourth embodiment.

FIG. 5 is a diagram illustrating a retinal scanning projection apparatus according to the fourth embodiment.

A retinal scanning projection apparatus 1C according to the present embodiment includes an electronic circuit board 12C. As the primary stop control unit, the electronic circuit board 12C includes the I/V converting unit 130, a comparison circuit 210, an OR circuit 215, and a latch circuit 220. As the secondary stop control unit, the electronic circuit board 12C includes a comparison circuit 230, an OR circuit 240, and a latch circuit 250.

A signal output from the latch circuit 220 and a signal output from the latch circuit 250 are input to an AND circuit 260. A signal output from the AND circuit 260 is supplied to the laser driver 124.

Voltages output from the I/V converting unit 130 are input to the comparison circuit 210 according to the present embodiment. It should be noted that currents are output from the light amount sensors 125a corresponding to respective color laser diodes, and are input to the I/V converting unit 130 so as to be converted to voltages. Therefore, the voltages corresponding to amounts of light emitted from the respective color laser diodes are input to the comparison circuit 210. Is it noted that a voltage output from the I/V converting unit 130 decreases as an amount of light detected by a corresponding light amount sensor 125a increases, and a voltage output from the I/V converting unit 130 increases as an amount of light detected by a corresponding light amount sensor 125a decreases.

For each of the input voltages, the comparison circuit 210 compares an input voltage to a predetermined threshold voltage (a first threshold voltage), and outputs a signal indicating a comparison result. The first threshold voltage according to the present embodiment is determined in accordance with properties of the light amount sensors 125a. The light amount sensors 125a may be, for example, photodiodes.

More specifically, when an input voltage is less than the first threshold voltage, the comparison circuit 210 outputs an H-level signal. When an input voltage is greater than or equal to the first threshold voltage, the comparison circuit 210 outputs an L-level signal. In other words, the comparison circuit 210 outputs an H-level signal when the amount of light emitted from any of the color laser diodes is equal to or exceeds a predetermined amount of light.

The signals output from the comparison circuit 210 are input to the OR circuit 215. In other words, the signals indicating the comparison results obtained from the respective color laser diodes are input to the OR circuit 215. When all the signals supplied from the comparison circuit 210 are L-level signals, the OR circuit 215 outputs an L-level signal. When any of the signals supplied from the comparison circuit 210 is an H-level signal, the OR circuit 215 outputs an H-level signal.

A signal output from the OR circuit 215 is input to the latch circuit 220. When an H-level signal is input to the latch circuit 220 from the OR circuit 215, the latch circuit 220 continues to output an H-level signal until the latch circuit 220 is reset. It should be noted that the latch circuit 220 is reset when the power of the retinal scanning projection apparatus 1C is turned off, for example.

Voltages at cathode sides of the laser diodes included in the laser module 125 are input to the comparison circuit 230 according to the present embodiment. For each of the input voltages, the comparison circuit 230 compares an input voltage to a predetermined threshold voltage (a second threshold voltage), and outputs a signal. When an input voltage is less than the second threshold voltage, the comparison circuit 210 outputs an H-level signal, and when an input voltage is greater than or equal to the second threshold voltage, the comparison circuit 210 outputs an L-level signal. In other words, the comparison circuit 210 outputs an H-level signal when a driving current supplied to any of the color laser diodes is equal to or exceeds a predetermined threshold current. The second threshold voltage according to the present embodiment is determined in accordance with properties of the laser diodes.

The signals output from the comparison circuit 230 are input to the OR circuit 240. A voltage output from the OR circuit 240 is input to the latch circuit 250. A signal output from the latch circuit 250 is input to the AND circuit 260.

Operations of the comparison circuit 230, the OR circuit 240, and the latch circuit 250 are similar to those of the comparison circuit 210, the OR circuit 215, and the latch circuit 220. Thus, a description thereof will be omitted.

When one or both of the signals output from the latch circuit 220 and output from the latch circuit 250 are H-level signals, the AND circuit 260 outputs a L-level signal to the laser driver 124.

When the L-level signal is input, the operation of the laser driver 124 according to the present embodiment is disabled, and supply of driving currents to the laser module 125 is stopped.

Figure 6:
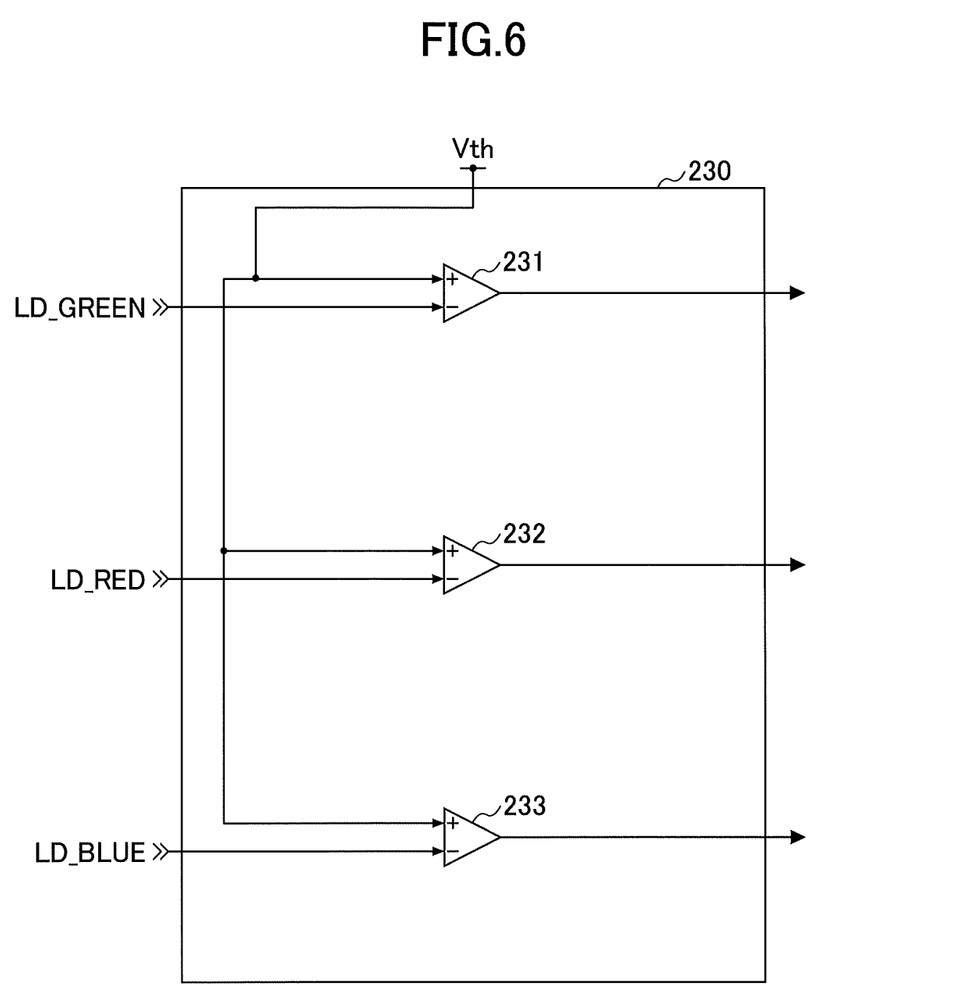
FIG. 6 is a diagram illustrating a comparison circuit according to the fourth embodiment.

Next, referring to FIG. 6, the comparison circuits 210 and 230 according to the present embodiment will be described. The comparison circuits 210 and 230 have the same configurations. In FIG. 6, as an exemplary comparison circuit according to the present embodiment, the configuration of the comparison circuit 230 will be described. FIG. 6 is a diagram illustrating the comparison circuit according to the fourth embodiment.

The comparison circuit 230 according to the present embodiment includes comparators 231, 232, and 233. A voltage Vth, which is the second threshold voltage, is input to one input of each of the comparators 231, 232, and 233.

A voltage at the cathode side of the green-emitting laser diode is input to the other input of the comparator 231. When the voltage at the cathode side falls below the voltage Vth, the comparator 231 outputs an H-level signal. The voltage at the cathode side falling below the voltage Vth indicates an overcurrent condition. In the overcurrent condition, the laser diode is subjected to a large voltage drop and an excess driving current is being supplied to the laser diode.

A voltage at the cathode side of the red-emitting laser diode is input to the other input of the comparator 232. When the voltage at the cathode side falls below the voltage Vth, the comparator 232 outputs an H-level signal. A voltage at the cathode side of the blue-emitting laser diode is input to the other input of the comparator 233. When the voltage at the cathode side becomes less than the voltage Vth, the comparator 233 outputs an H-level signal.

The signals output from the respective comparators 231, 232, and 233 are input to the OR circuit 240.

In the present embodiment, when an overcurrent occurs even in one laser diode of the plurality of laser diodes included in the laser module 125, the laser driver 124 is disabled, and the supply of driving currents to the laser module is stopped.

As described above, in the present embodiment, the supply of driving currents to the laser module 125 can be stopped when an amount of light emitted from any of the laser diodes is equal to or exceeds the predetermined amount of light and/or when a driving current supplied to any of the laser diodes is equal to or exceeds the predetermined threshold.

Accordingly, in the present embodiment, the primary stop control unit and the secondary stop control unit configured by the circuits can prevent an overcurrent from being supplied to the light source without control by the laser control unit 122, thus improving safety.

Fifth Embodiment

Figure 7:
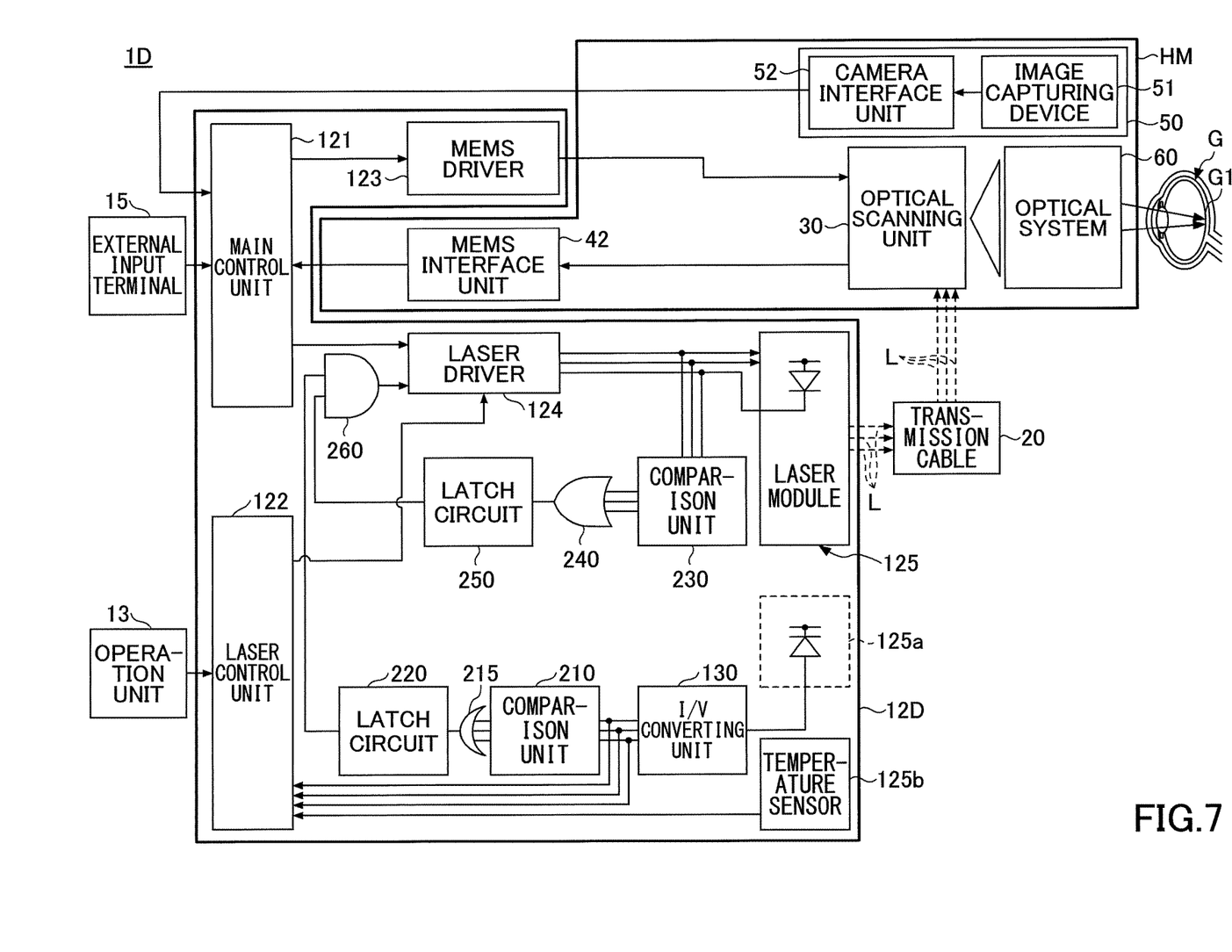
FIG. 7 is a diagram illustrating a retinal scanning projection apparatus according to a fifth embodiment.

A fifth embodiment will be described below with reference to the drawings. The fifth embodiment differs from the fourth embodiment in that the fifth embodiment has a configuration in which the fourth embodiment is combined with control by the laser control unit 122. In the following fifth embodiment, only differences from the fourth embodiment will be described. Elements having the same functional configurations as the fourth embodiment are referred to by the same reference numerals used in the fourth embodiment, and thus a description thereof will be omitted.

FIG. 7 is a diagram illustrating a retinal scanning projection apparatus according to the fifth embodiment. A retinal scanning projection apparatus 1D illustrated in FIG. 7 includes an electronic circuit board 12D. In the electronic circuit board 12D, voltages output from the I/V converting unit 130 are supplied to the laser control unit 122.

The laser control unit 122 causes the laser driver 124 to stop the supply of driving currents when any voltage output from the I/V converting unit 130 is equal to or exceeds a predetermined threshold voltage, namely when any amount of light detected by the light amount sensors 125a is equal to or exceeds a predetermined amount of light.

Accordingly, in the present embodiment, the retinal scanning projection apparatus 1D includes two primary stop control units that stop the operation of the laser driver 124 based on the amounts of light detected by the light amount sensors 125a.

Accordingly, in the present embodiment, it is possible to prevent an overcurrent from being supplied to the light source, thus improving safety.

Sixth Embodiment

Figure 8:
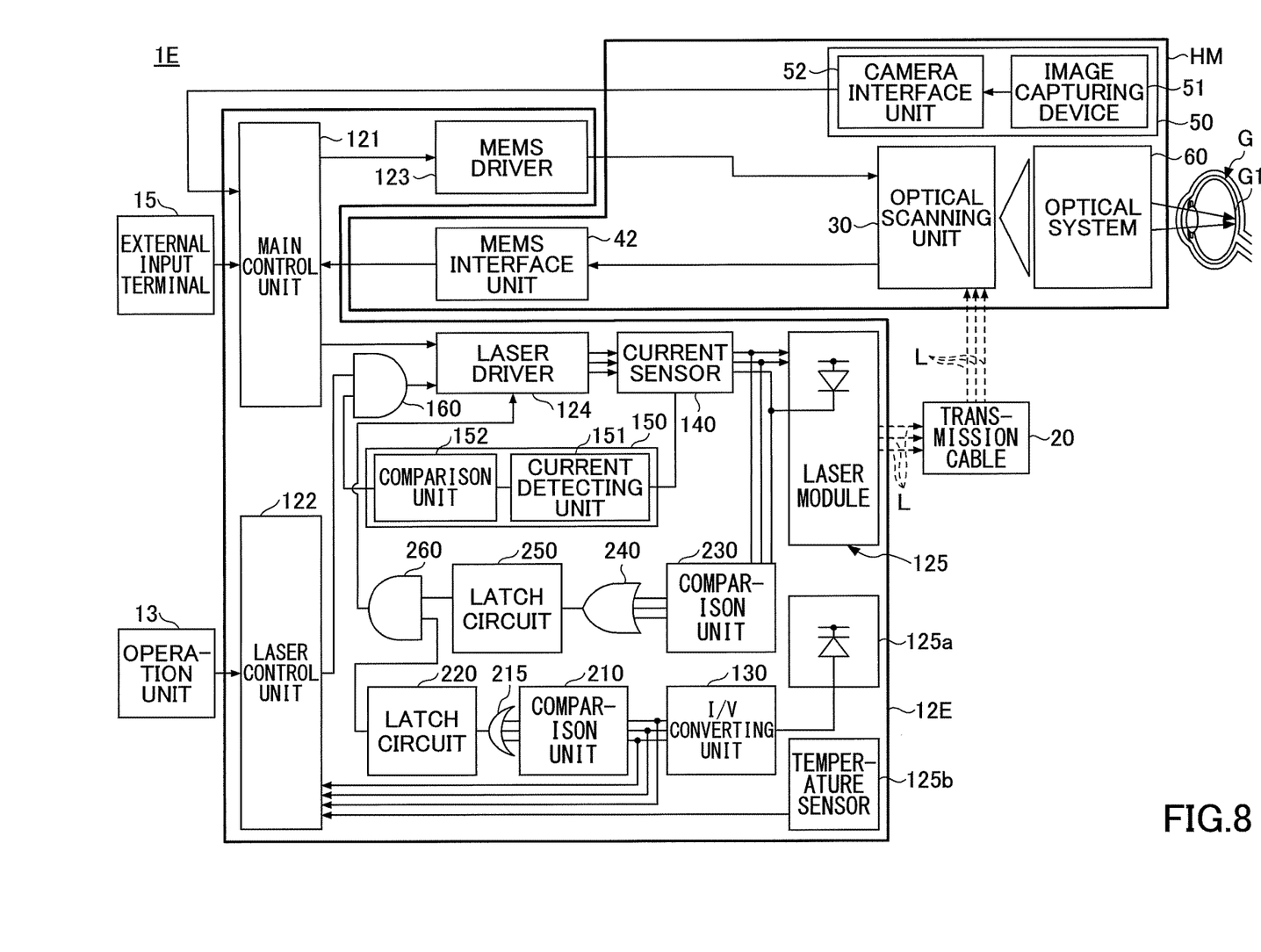
FIG. 8 is a diagram illustrating a retinal scanning projection apparatus according to a sixth embodiment.

A sixth embodiment will be described below with reference to the drawings. The sixth embodiment has a configuration in which the fourth embodiment is combined with the first embodiment.

FIG. 8 is a diagram illustrating a retinal scanning projection apparatus according to the sixth embodiment. A retinal scanning projection apparatus 1E illustrated in FIG. 8 includes an electronic circuit board 12E. In the electronic circuit board 12E, an excess driving current supplied to any of laser diodes is detected by two systems of the current sensor 140 and the comparison circuit 230. In other words, the electronic circuit board 12E according to the present embodiment includes two secondary stop control units that stop the supply of driving currents based on the driving currents supplied to the laser diodes.

Accordingly, in the present embodiment, it is possible to prevent an overcurrent from being supplied to the light source, thus improving safety.

Seventh Embodiment

Figure 9:
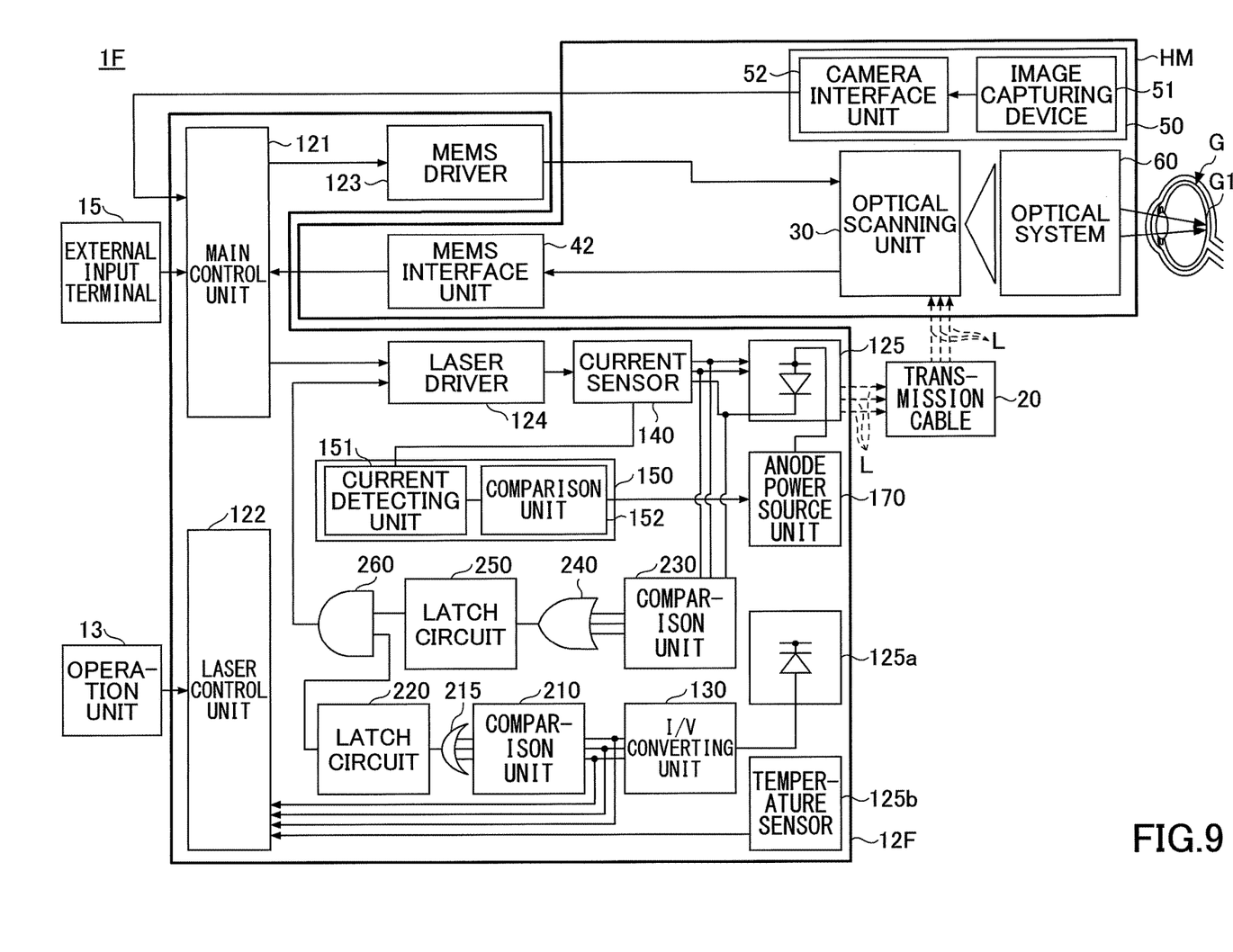
FIG. 9 is a diagram illustrating a retinal scanning projection apparatus according to a seventh embodiment.

A seventh embodiment will be described below with reference to the drawings. The seventh embodiment has a configuration in which the fourth embodiment is combined with the second embodiment.

FIG. 9 is a diagram illustrating a retinal scanning projection apparatus according to the seventh embodiment. A retinal scanning projection apparatus 1F illustrated in FIG. 9 includes an electronic circuit board 12F. In the electronic circuit board 12F, when the current sensor 140 detects that a driving current supplied to any of laser diodes is an overcurrent, the power supplied from the anode power source unit 170 to the laser diodes is stopped. Further, in the present embodiment, when the comparison circuit 230 detects that a driving current supplied to any of the laser diodes is an overcurrent, the supply of driving currents from the laser driver 124 to the laser diodes is stopped.

In other words, the retinal scanning projection apparatus 1F according to the present embodiment includes two secondary stop control units configured to stop the supply of driving currents based on the driving currents supplied to the laser diodes.

Accordingly, in the present embodiment, it is possible to prevent an overcurrent from being supplied to the light source, thus improving safety.

Eighth Embodiment

Figure 10:
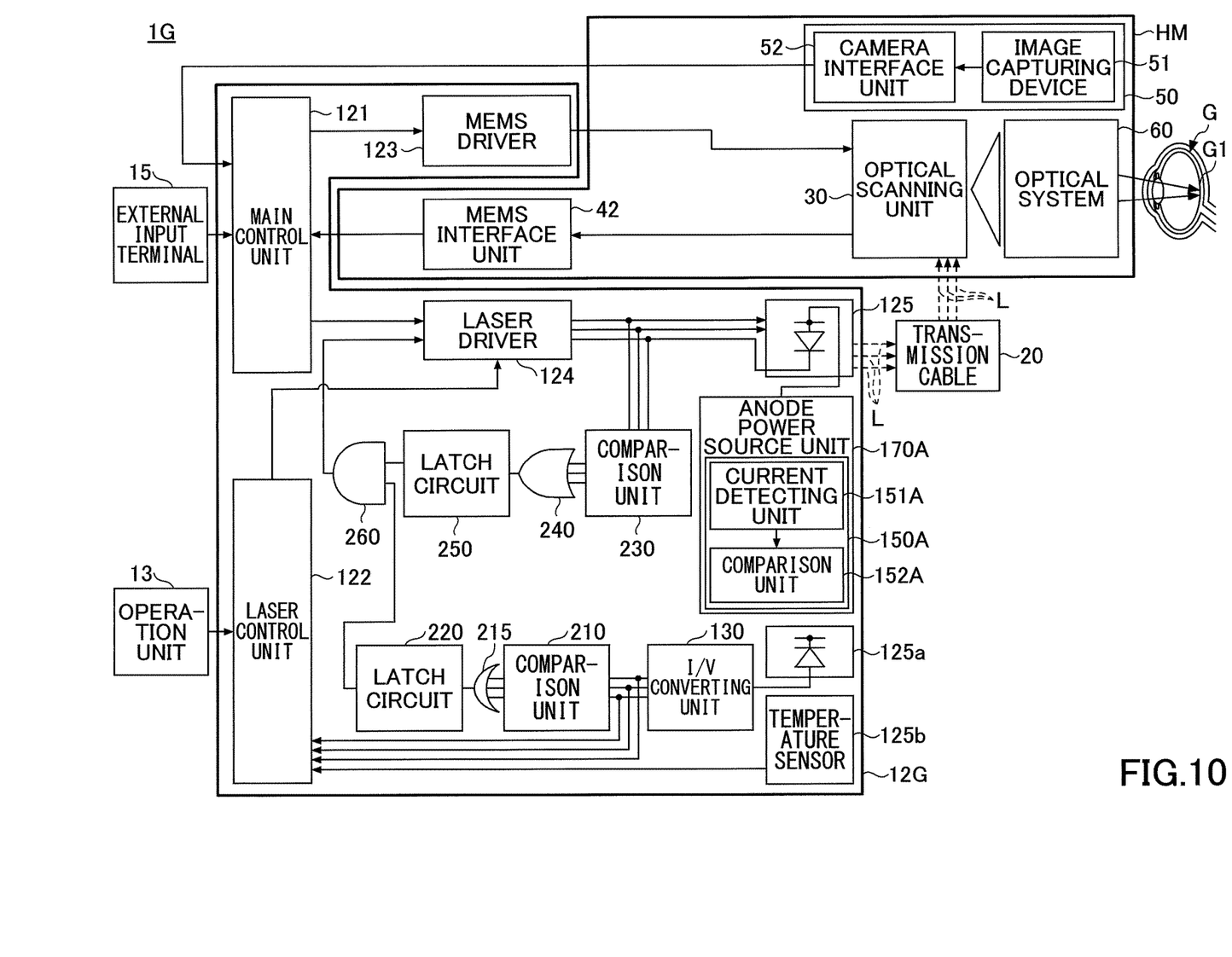
FIG. 10 is a diagram illustrating a retinal scanning projection apparatus according to an eighth embodiment.

An eighth embodiment will be described below with reference to the drawings. The eighth embodiment has a configuration in which the fourth embodiment is combined with the third embodiment.

FIG. 10 is a diagram illustrating a retinal scanning projection apparatus according to the eighth embodiment. A retinal scanning projection apparatus 1G illustrated in FIG. 10 includes an electronic circuit board 12G. In the electronic circuit board 12G, when the current detecting unit 151 of the anode power source unit 170A detects that a driving current supplied to any of laser diodes is an overcurrent, the power supplied from the anode power source unit 170A to the laser diodes is stopped. Further, in the present embodiment, when the comparison circuit 230 detects that a driving current supplied to any of the laser diodes is an overcurrent, supply of the driving currents from the laser driver 124 is stopped.

In other words, the retinal scanning projection apparatus 1G according to the present embodiment includes two secondary stop control units configured to stop supplying driving currents based on the driving currents supplied to the laser diodes.

Accordingly, in the present embodiment, it is possible to prevent an overcurrent from being supplied to the light source, thus improving safety.

Although the present invention has been described with reference to the embodiments, the present invention is not limited to the specific configurations and combinations described in the above embodiments. Various variations and modifications may be made without departing from the scope of the present invention.

The present application is based on and claims priority of Japanese Priority Application No. 2016-194861, filed on Sep. 30, 2016, the entire contents of which are hereby incorporated herein by reference.

DESCRIPTION OF THE REFERENCE NUMERALS 1, 1A, 1B, 1C, 1D, 1E, 1F, 1G retinal scanning projection apparatus
   10, 10A, 10B optical scanning control device
   11 housing
   11a base portion
   11c lid portion
   11d protruding portion
   12, 12A, 12B, 12C, 12D, 12E, 12F, 12G electronic circuit board
   13 operation unit
   14 IC chip
   15 external input terminal
   20 transmission cable
   30 optical scanning unit
   40 eyeglass frame
   42 MEMS interface unit
   50 image capturing unit
   51 image capturing device
   52 camera interface unit
   60 optical system
   HM head mount unit
   121 main control unit
   122 laser control unit
   123 MEMS driver
   124 laser driver
   125 laser module
   130 I/V converting unit
   140 current sensor
   150, 150A overcurrent detecting unit
   151, 151A current detecting unit
   152, 152A comparison unit
   160, 260 AND circuit
   170, 170A anode power source unit
   210, 230 comparison circuit
   215, 240 OR circuit
   220, 250 latch circuit

The invention claimed is:

1. An optical scanning apparatus comprising:
a light source configured to emit light;
a light source driving unit configured to supply a driving current to the light source;
an optical scanning unit configured to scan the light emitted from the light source in accordance with an image signal such that the light is projected onto a projection surface;
a light amount sensor configured to detect an amount of the light;
a current sensor configured to detect the driving current;
a primary stop control unit configured to stop an operation of the light source driving unit when the amount of the light is equal to or exceeds a predetermined amount of light; and
a secondary stop control unit configured to stop supply of the driving current to the light source when a value of the driving current is equal to or exceeds a predetermined threshold;
wherein the primary stop control unit is a laser control unit configured to stop the operation of the light source driving unit when an overcurrent, which is a current greater than or equal to a preset current, is detected as being supplied to the light source,
wherein the secondary stop control unit is a overcurrent detecting unit that includes a current detecting unit configured to detect the value of the driving current and a comparison unit, the comparison unit being configured to compare the value of the driving current to the predetermined threshold and to output a signal for stopping the operation of the light source driving unit when the driving current is equal to or exceeds the predetermined threshold,
wherein an output of the primary stop control unit is supplied to one input of an AND circuit, an output of the secondary stop control unit is supplied to another input of the AND circuit, and an output of the AND circuit is supplied to the light source driving unit, and
wherein the light source driving unit stops the supply of the driving current in accordance with the output of the AND circuit.

2. A retinal scanning head-mounted display comprising:
a light source configured to emit light;
a light source driving unit configured to supply a driving current to the light source;
an optical scanning unit configured to scan the light emitted from the light source in accordance with an image signal such that the light is projected onto a retina of a user;
a light amount sensor configured to detect an amount of the light;
a current sensor configured to detect the driving current;
a primary stop control unit configured to stop an operation of the light source driving unit when the amount of the light is equal to or exceeds a predetermined amount of light; and
a secondary stop control unit configured to stop supply of the driving current to the light source when a value of the driving current is equal to or exceeds a predetermined threshold;
wherein the primary stop control unit is a laser control unit configured to stop the operation of the light source driving unit when an overcurrent, which is a current greater than or equal to a preset current, is detected as being supplied to the light source,
wherein the secondary stop control unit is a overcurrent detecting unit that includes a current detecting unit configured to detect the value of the driving current and a comparison unit, the comparison unit being configured to compare the value of the driving current to the predetermined threshold and to output a signal for stopping the operation of the light source driving unit when the driving current is equal to or exceeds the predetermined threshold, wherein an output of the primary stop control unit is supplied to one input of an AND circuit, an output of the secondary stop control unit is supplied to another input of the AND circuit, and an output of the AND circuit is supplied to the light source driving unit, and wherein the light source driving unit stops the supply of the driving current in accordance with the output of the AND circuit.

3. An optical scanning apparatus comprising:

a light source configured to emit light;

a light source driving unit configured to supply a driving current to the light source;

an optical scanning unit configured to scan the light emitted from the light source in accordance with an image signal such that the light is projected onto a projection surface;

a light amount sensor configured to detect an amount of the light;

a current sensor configured to detect the driving current;

a first stop control unit configured to stop an operation of the light source driving unit when the amount of the light is equal to or greater than a predetermined amount of light;

a second stop control unit configured to stop an operation of the light source driving unit when a value of the driving current is equal to or greater than a predetermined threshold;

a third stop control unit including a first comparison circuit configured to compare a voltage at a cathode side of the light source to a second threshold, the third stop control unit configured to stop an operation of the light source driving unit when the voltage at the cathode side of the light source falls below the second threshold; and a fourth stop control unit including a second comparison circuit configured to compare a voltage corresponding to the amount of light detected by the light amount sensor to a first threshold, the fourth stop control unit configured to stop an operation of the light source driving unit when the voltage corresponding to the amount of light detected by the light amount sensor is equal to or greater than the first threshold;

wherein, when (i) the light amount is equal to or greater than the predetermined amount of light, (ii) the value of the driving current is equal to or greater than the predetermined threshold, (iii) the voltage at the cathode side of the light source falls below the second threshold, or (iv) the voltage corresponding to the amount of light detected by the light amount sensor is equal to or greater than the first thresholds at least one of the first stop control unit, the second stop control unit, the third stop control unit, or the fourth stop control unit causes an operation of the light source driving unit to be stopped, causing emission of light from the light source to stop.

* * * * *